Patented Nov. 15, 1927.

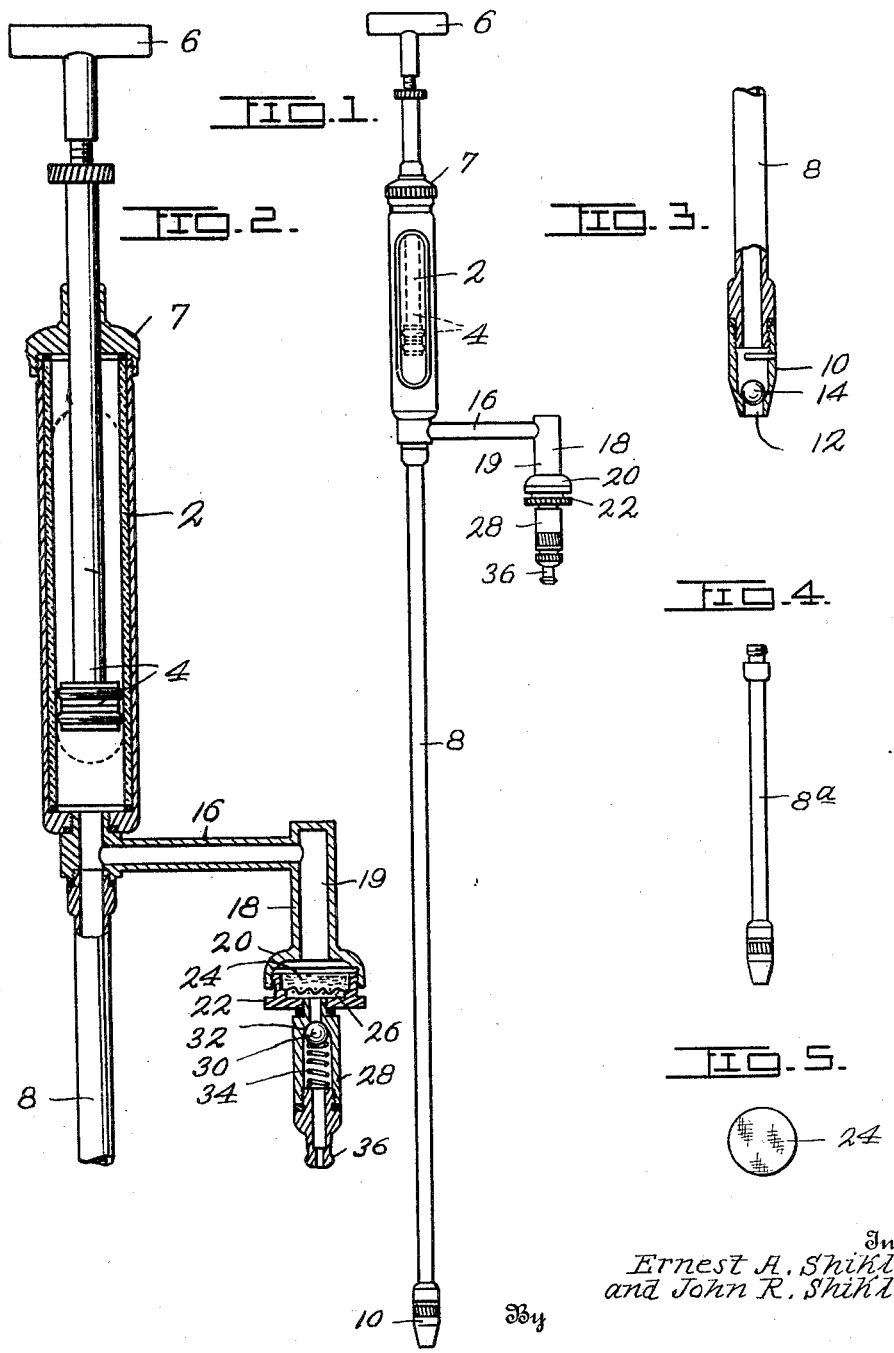

1,649,193

UNITED STATES PATENT OFFICE.

ERNEST A. SHIKLES AND JOHN R. SHIKLES, OF DEARBORN, MISSOURI.

SEDIMENT TESTER.

Application filed May 4, 1927. Serial No. 188,674.

Our invention relates to testing devices whereby the sediment content of milk can be readily ascertained at creameries, condenseries, etc., and one object is to provide a testing device of this character whereby a sample of milk can be withdrawn from the lower portion of a standard milk can and tested while being discharged back into the same can, thereby enabling an inspector to test the milk in a multiple of cans within a short period of time.

A further object is to provide a testing device of relatively few parts which are not likely to get out of order and which can be readily taken apart and cleansed and thereby maintained in a sanitary condition.

In order that the invention may be fully understood, reference will now be had to the accompanying drawing, in which:

Fig. 1 is a side elevation of the testing device.

Fig. 2 is an enlarged broken sectional view of the upper portion of the testing device.

Fig. 3 is a fragmentary detail, partly in section, of a long suction tube forming a part of the device.

Fig. 4 is a detail side elevation of a short suction tube which can be substituted for the longer one, when milk in bottles and other small containers is to be tested.

Fig. 5 is a detail of a fabric disk for intercepting the sediment in the milk as the latter passes through the tester.

Referring in detail to the different parts, 2 designates a cylinder in which a piston 4 is reciprocably mounted, the upper end of said piston being provided with a suitable handle 6. The cylinder 2 has a removable head 7 in order that the piston 4 may be removed when it is desired to cleanse the latter and the interior of the cylinder 2.

8 designates the long suction tube which is provided at its lower end with a removable valve casing 10 having an inlet port 12 controlled by a self-closing valve 14 which is preferably of the ball type, as shown by Fig. 3. The upper end of the suction tube 8 is removably connected to the lateral branch 16 of a discharge tube 18. Said lateral branch 16 is removably connected to the lower end of the cylinder 2, while the discharge tube 18 has an enlarged downwardly directed leg 19 provided with a flaring lower end 20 to which a filter 22 is removably connected. The filter 22 is cup-shaped and provided with suitable filtering material such as a cotton disk 24 which is supported upon a screen 26.

The discharge tube 18 is provided with a discharge nozzle 28 which is removably connected to the lower side of the filter 22 and provided with a valve 30 which is preferably of the ball type and yieldably held against its seat 32 by suitable means such as a coil spring 34. The discharge nozzle 28 is provided with a removable jet 36 which supports the coil spring 34.

In testing milk in a standard milk can, the suction tube 8 is lowered into said can until the lower end of the valve casing 10 nearly touches the bottom where the sediment normally settles. The handle 6 is then grasped and the piston 4 is pulled upwardly to draw a sample of the milk into the cylinder 2 through the valve casing 10, the suction tube 8, and the communicating end of the lateral branch 16. The piston 4 is then forced downwardly to discharge the sample back into the same can through the discharge tube 18, the filter 22, the nozzle 28 and the jet 36.

As the piston 4 is drawn upwardly as stated, the valve 14 opens to admit the sample, while the valve 30 remains seated to prevent air from entering the cylinder 2 through the discharge tube 18. When the piston 4 is pushed downwardly to expel the sample from the cylinder 2, the valve 14 is forced to its seat, while the valve 30 is unseated by the pressure of the sample being expelled from the cylinder 2. As the sample is expelled the enlarged leg 19 and the flaring end 20 of the discharge tube 18 permit said sample to spread over the entire area of the filter 22, so that the discharge will not be unduly retarded as would be the case if the sample had to pass through a smaller area. As the sample of milk passes through the filter 22 the sediment in said sample is intercepted by the cotton disk 24, which latter is then removed so that it can be compared with the usual chart in order that the exact sediment content of the milk in the can can be readily determined. Where an inspector is testing the milk in a number of cans furnished by the same producer, one disk 24 need only be used to determine the average sediment content in all of said cans, but a separate disk 24 of course is employed in determining the sediment content of the milk supplied by each producer.

On completion of the test, the several parts of the device can be readily taken apart and thoroughly cleansed so that the device will be in a sanitary condition for future use.

For domestic purposes where it is desirable to test the sediment content of milk in a standard quart or pint bottle, the short suction tube 8ª is substituted for the long suction tube 8.

From the foregoing description it is apparent that we have provided a testing device embodying the advantages above pointed out, and while we have shown and described the preferred construction, combination and arrangement of parts, we reserve all rights to such changes and modifications as properly fall within the spirit and scope of the invention as claimed.

Having thus described our invention, what we claim and desire to secure by Letters Patent, is:

1. A testing device of the character described consisting of a cylinder, a reciprocatory piston mounted within said cylinder, a valve-controlled suction tube communicating with said cylinder, a discharge tube communicating with said cylinder and provided with an enlarged leg having a flaring terminal, and a filter connected to said flaring terminal.

2. A testing device of the character described consisting of a cylinder, a reciprocatory piston mounted within said cylinder, a valve-controlled suction tube communicating with said cylinder, a discharge tube communicating with said cylinder and provided with an enlarged leg having a flaring terminal, a filter connected to said flaring terminal, and a nozzle communicating with said filter.

3. A testing device of the character described consisting of a cylinder, a reciprocatory piston mounted within said cylinder, a valve-controlled suction tube communicating with said cylinder, a discharge tube communicating with said cylinder and provided with an enlarged leg having a flaring terminal, a filter connected to said flaring terminal, a nozzle communicating with said filter, and a self-closing valve arranged within said nozzle.

4. A testing device of the character described consisting of a cylinder, a reciprocatory piston mounted within said cylinder, a suction tube communicating with said cylinder, a self-closing valve within said suction tube, a discharge tube removably connected to the cylinder and said suction tube, a self-closing valve associated with said discharge tube, and a filter removably connected to said discharge tube.

In testimony whereof we affix our signatures.

ERNEST A. SHIKLES.
JOHN R. SHIKLES.